No. 710,704. Patented Oct. 7, 1902.
H. S. MILLS.
BLOW TESTING MACHINE.
(Application filed Jan. 25, 1902.)

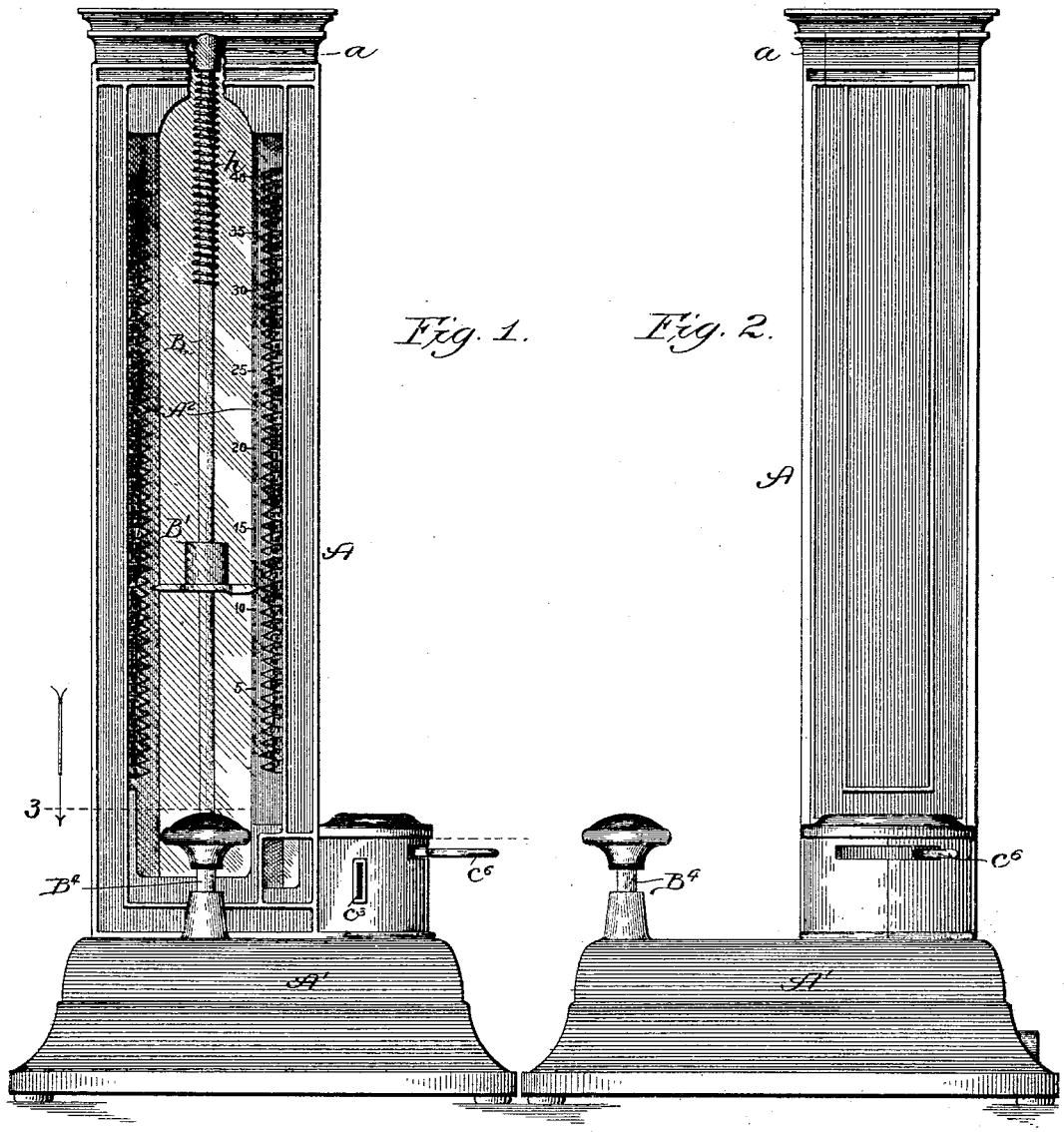

(No Model.) 5 Sheets—Sheet 2.

Witnesses: Inventor:
Herbert S. Mills,
By Dyrenforth, Dyrenforth & Lee,
Att'ys.

No. 710,704. Patented Oct. 7, 1902.
H. S. MILLS.
BLOW TESTING MACHINE.
(Application filed Jan. 25, 1902.)
(No Model.) 5 Sheets—Sheet 3.

Witnesses:
C. A. Taylor
John Enders Jr.

Inventor:
Herbert S. Mills.
By Dyrenforth, Dyrenforth & Lee,
Att'ys.

THE NORRIS PETERS CO., PHOTO-LITHO., WASHINGTON, D. C.

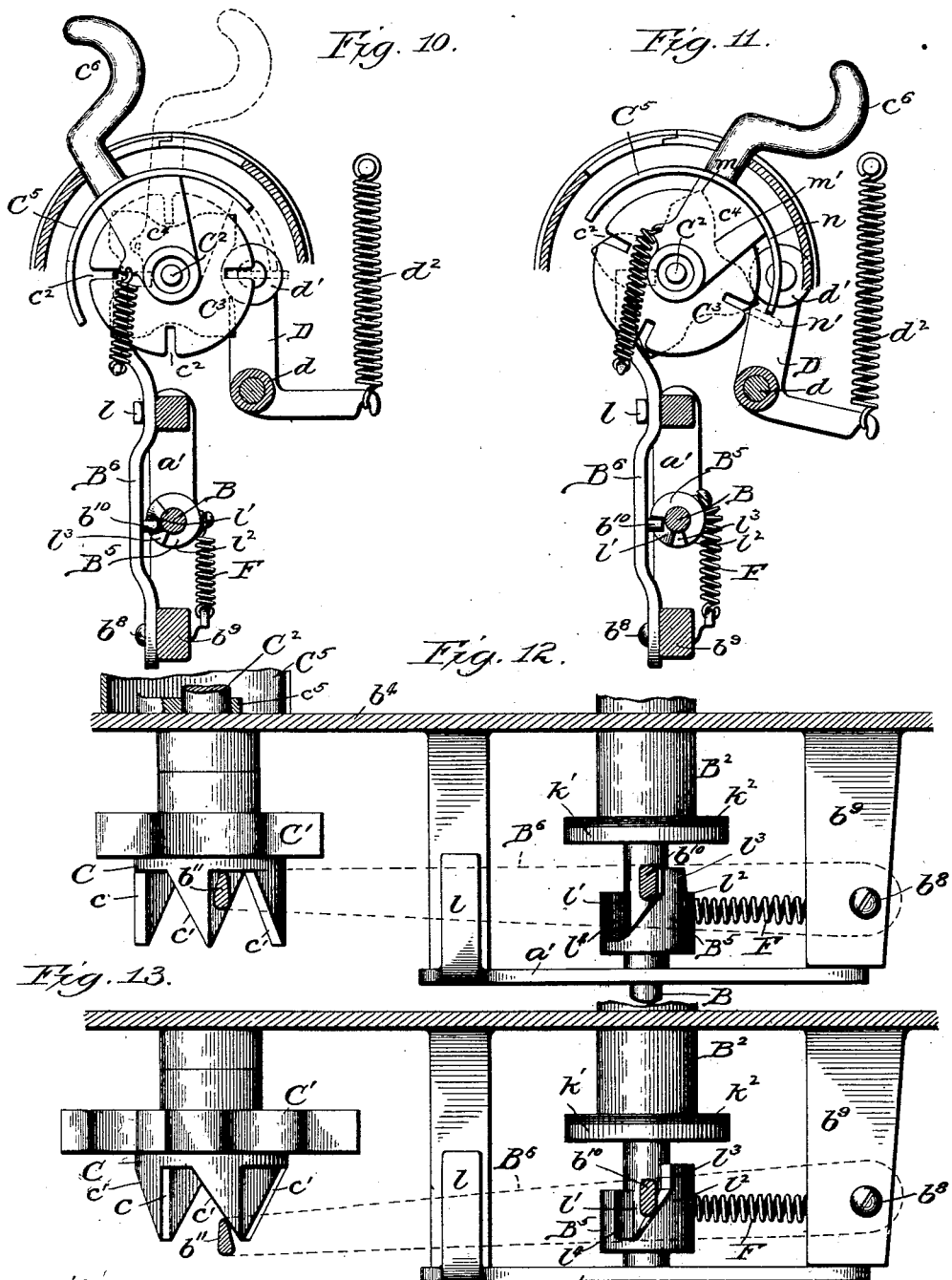

No. 710,704. Patented Oct. 7, 1902.
H. S. MILLS.
BLOW TESTING MACHINE.
(Application filed Jan. 25, 1902.)
(No Model.) 5 Sheets—Sheet 5.
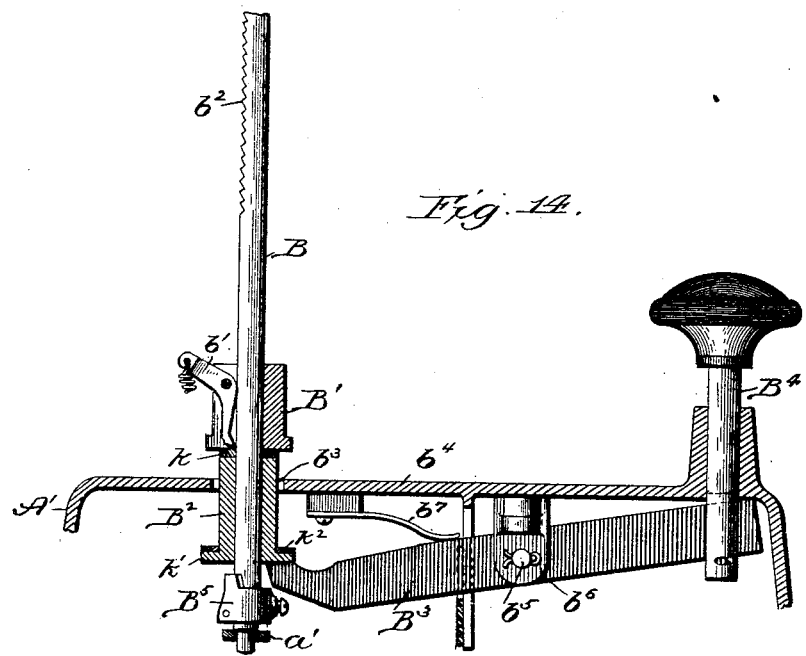
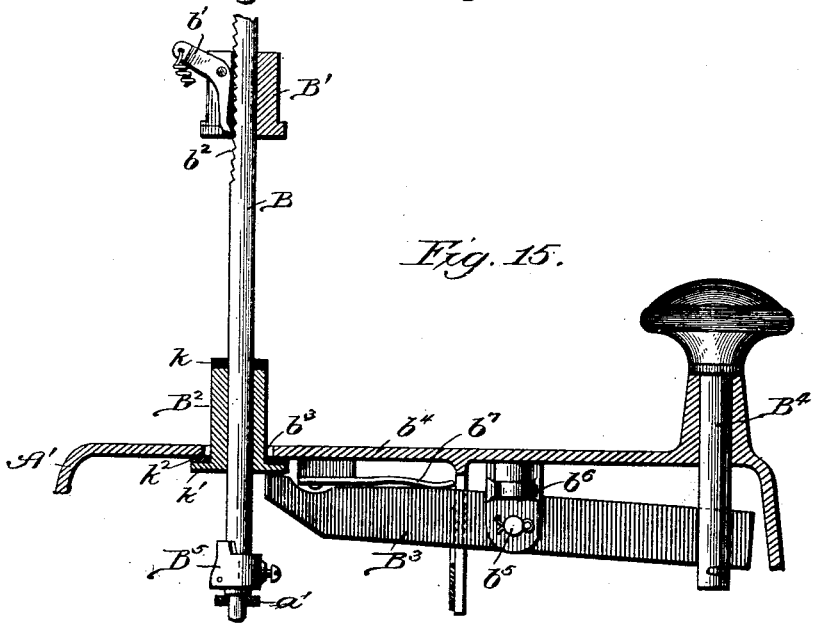
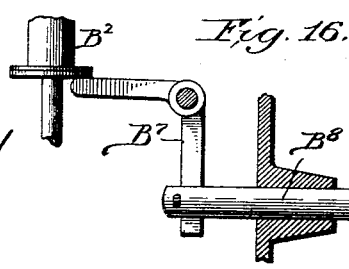
Witnesses:
Inventor:
Herbert S. Mills,

UNITED STATES PATENT OFFICE.

HERBERT S. MILLS, OF CHICAGO, ILLINOIS.

BLOW-TESTING MACHINE.

SPECIFICATION forming part of Letters Patent No. 710,704, dated October 7, 1902.

Application filed January 25, 1902. Serial No. 91,149. (No model.)

*To all whom it may concern:*

Be it known that I, HERBERT S. MILLS, a citizen of the United States, residing at Chicago, in the county of Cook and State of Illinois, have invented a new and useful Improvement in Blow-Testing Machines, of which the following is a specification.

My invention relates particularly to machines for use in testing strength and skill; and my primary object is to provide an improved machine of this character which is capable of use both for indicating the strength of blows and as a means of amusement and test of skill in causing the weight employed to stop at a predetermined point.

My invention is illustrated in its preferred form in the accompanying drawings, in which—

Figure 3:
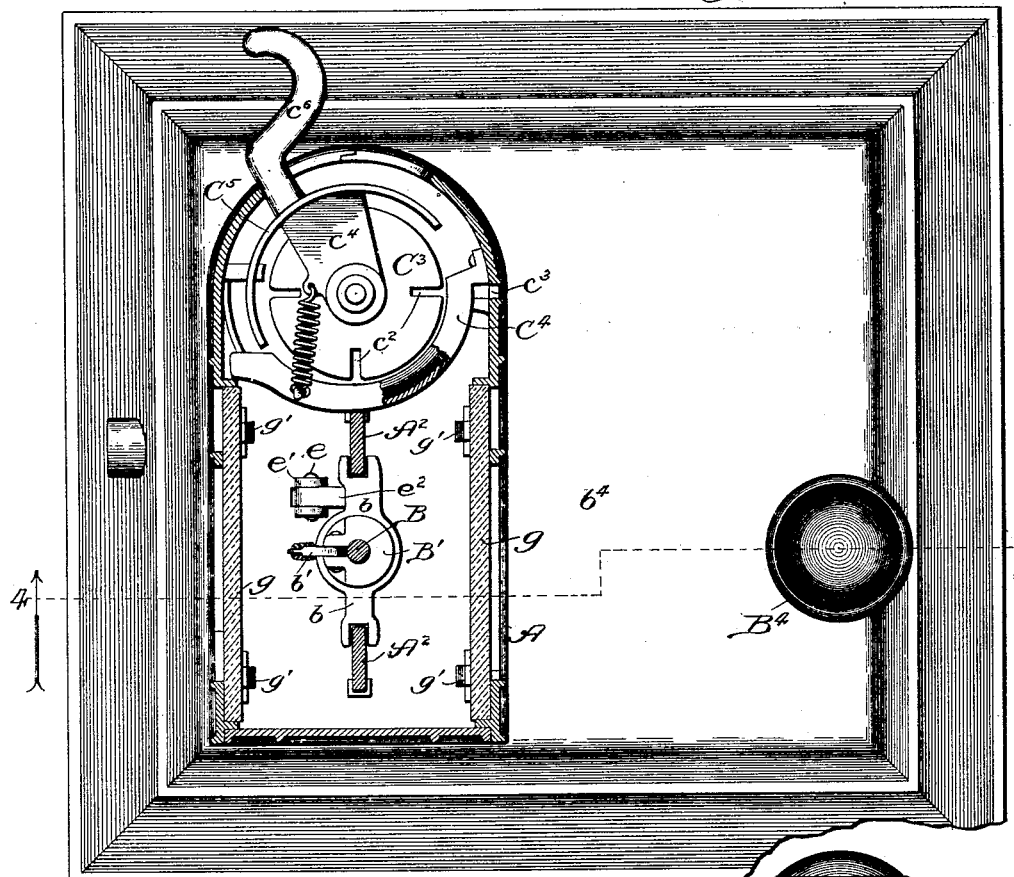
Figure 4:
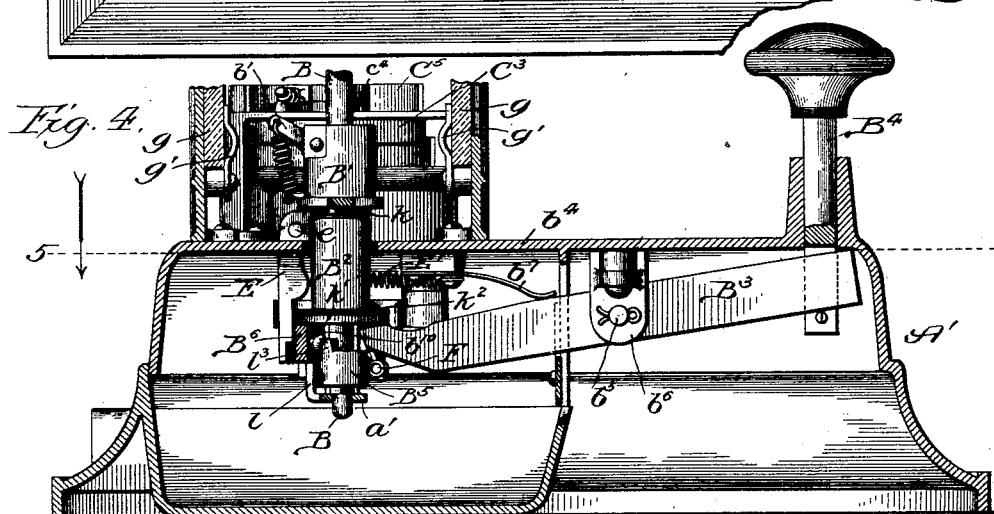
Figure 5:
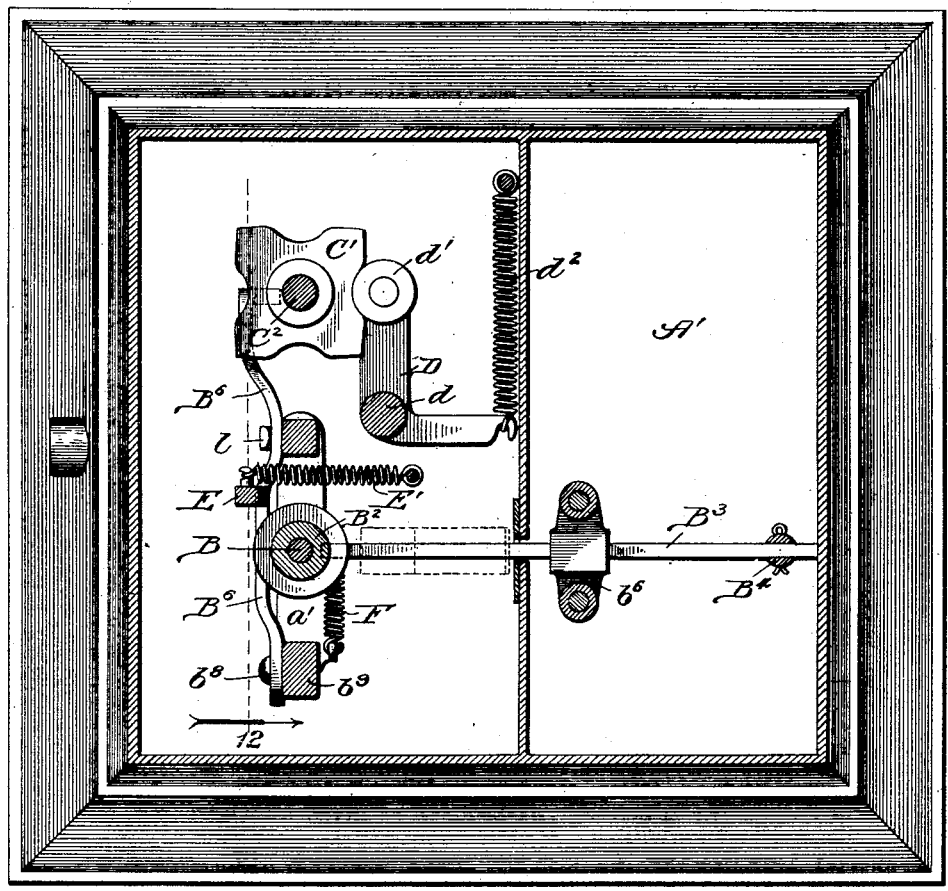
Figure 6:
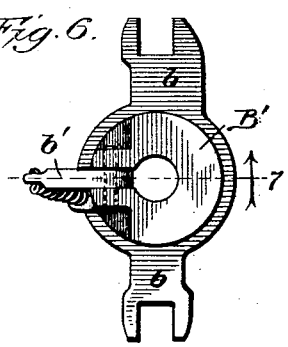
Figure 7:
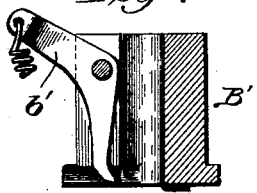
Figure 8:
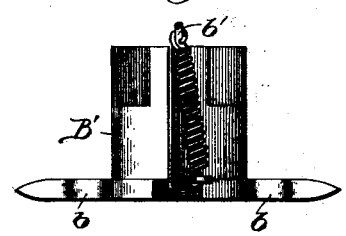
Figure 9:
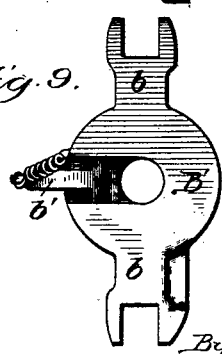

Figure 1 is a view in front elevation of my improved striking-machine; Fig. 2, a view in side elevation of the same; Fig. 3, a plan section taken, as indicated, at line 3 of Fig. 1; Fig. 4, a broken vertical section parallel to a side of the machine, the same being taken, as indicated, at line 4 of Fig. 3; Fig. 5, a plan section taken, as indicated, at line 5 of Fig. 4; Fig. 6, a plan view of the weight employed; Fig. 7, a vertical section taken on line 7 of Fig. 6; Figs. 8 and 9, rear and bottom views, respectively, of said weight; Fig. 10, a broken horizontal sectional view showing one position of the coin-controlled weight-releasing mechanism shown in connection with my improved machine and which is peculiarly adapted for use therewith; Fig. 11, a similar view showing another position of said mechanism; Fig. 12, a broken vertical section parallel to the rear side of the machine, said section being taken, as indicated, at line 12 of Fig. 5 and illustrating a position of the weight-releasing lever corresponding with Fig. 10; Fig. 13, a section similar to Fig. 12, but showing a position of the parts corresponding with Fig. 11; Figs. 14 and 15, broken vertical sectional views taken parallel to a side of the machine and showing different positions of the weight-impelling lever employed, and Fig. 16 a broken section illustrating a modification of the weight-impelling lever.

The preferred construction is as follows: A represents a casing provided with a base A' and vertical weight-guides $A^2$; B, a central vertical shaft journaled in bearings $a\ a'$ at the top and base, respectively, of the casing; B', a weight provided with grooved arms $b$, engaging the guides $A^2$ and provided with a spring-held pawl $b'$, which serves to engage ratchet-teeth $b^2$, with which the shaft B is provided; $B^2$, a hollow sleeve or plunger extending through a perforation $b^3$, with which the top wall $b^4$ of the base A' is provided; $B^3$, a weight-impelling lever secured by a pivot $b^5$ to lugs $b^6$, with which the base of the casing is provided, the rear end of said lever being held normally depressed by a spring $b^7$; $B^4$, a vertically-movable striking-plunger connected with the front end of the lever $B^3$; $B^5$, a cam with which the lower end of the shaft B is equipped and through the medium of which said shaft is given a partial rotation to release the weight from the rack $b^2$; $B^6$, a cam-actuating lever located in the base of the casing and secured by a pivot $b^8$ to a lug $b^9$ and provided between its ends with a cam-engaging lug $b^{10}$ and provided at its free end with a wheel-engaging lug $b^{11}$; C, a wheel having downwardly-projecting teeth $c$, provided with inclined surfaces $c'$, which serve to engage the lug $b^{11}$ and actuate the lever $B^6$; C', a horizontally-disposed star-wheel formed integrally with the wheel C; $C^2$, a vertically-disposed shaft, to the lower end of which the wheels C C' are firmly secured; $C^3$, a coin-actuated wheel fixed to the shaft $C^2$ and serving to rotate the latter, said wheel $C^3$ being provided peripherally with coin-recesses $c^2$; $C^4$, a segmental stationary coin-guide which coacts with the wheel $C^3$, a coin-slot $c^3$ being provided at the front end of said guide; $C^5$, a manually-operated coin-actuating member of segmental form, said member being provided at its upper and lower ends with lugs $c^4\ c^5$, respectively, journaled on the shaft $C^2$, and provided also with an operating-handle $c^6$; D, a bell-crank lever pivotally secured at $d$ in the base of the frame or casing, said lever being provided with a roller $d'$, engaging the star-wheel C', and provided also with a spring $d^2$, which serves to press said roller firmly against said star-wheel; E, a latch for the lever $B^6$, of bell-crank form, projecting through the wall $b^4$ and secured to a fixed pivot $e$, supported by lugs $e'$, said bell-crank having a forwardlyprojecting arm $e^3$, located at the lower end of the traverse of the weight B'; E', a spring for the latch E, and F a spring which serves to restore the shaft B to its normal position after it has been actuated to release the weight.

Preferably the casing has front and rear glass walls $g$, held in place by pivoted spring-catches $g'$, and the guides $A^2$ are each provided with a series of points indicated by the numerals "1," "2," "3," "4," "5," &c., and by the numerals "1'," "2'," "3'," "4'," "5'," &c., the points of one series being staggered with relation to the points of the other series. Also one of the guides $A^2$ is provided with graduations marked with the numerals "5," "10," "15," "20," &c., indicating the strength of blows required to elevate the weight to the several positions. The rod B is equipped at its upper end with a relatively long spring $h$, the upper end of which bears against the lug $a$. The sleeve or hollow plunger $B^2$ is equipped at its upper end with a washer $k$, of yielding material, and at its lower end is provided with a flange $k'$, equipped on its upper surface with a washer $k^2$, of yielding material, the upward movement of said sleeve $B^2$ being limited by engagement of said washer with the under surface of the wall $b^4$. The arms $b$ of the weight B' have pointed extremities, so as to serve as pointers. The shaft B is preferably round, so that when the shaft is rotated the rack $b^2$ of the weight will be readily moved out of engagement with the pawl $b'$.

The lever $B^6$ is one of the second class and moves along a guide $l$, located between the ends of the lever. The lug $b^{10}$ of said lever engages a cam-slot $l'$, with which the member $B^5$ is provided, said slot having an inclined lower wall $l^2$ and vertical walls $l^3$ $l^4$. It readily will be understood that when the lever $B^6$ is depressed the inclined wall $l^2$ is engaged by the lug $b^{10}$, thereby causing the member $b^5$ to rotate and actuate the shaft B. When the lever is free to rise again, the spring F rotates the member $B^5$ in the opposite direction till the lug $b^{10}$ engages the vertical wall $l^3$.

The star-wheel C' preferably has four points $m$ and recesses or hollows $m'$ intermediate said points. The coin-recesses $c^2$ of the coin-actuated wheel $C^3$ are correspondingly four in number.

The operation will be readily understood from the foregoing detailed description. Assuming the weight B' to have been forced upwardly by striking the plunger $B^4$ downwardly, said weight may be released by inserting a coin at $c^3$ and operating the lever $c^6$. The operation of said lever $c^6$ causes a coin-engaging finger $n$ of the member $C^5$ to engage a coin, as at $n'$ in Fig. 11, thereby causing the wheel $C^3$ and shaft $C^2$ to rotate. Before the lever $c^6$ reaches the end of its traverse the shaft $C^2$ is turned far enough to cause the appropriate point $m$ of the star-wheel C' to pass beneath the roller $d'$, after which the member D serves to actuate the star-wheel and through the medium thereof to continue the rotation of the wheel C. During the rotation of the wheel, first by operation of the lever $c^6$ and then by operation of the spring-retracted device D, the appropriate inclined surface of the wheel C serves to engage the lug $b^{11}$ of the lever $B^6$ and actuate said lever. As the lever $B^6$ moves downwardly the lug $b^{10}$ actuates the cam $B^5$, thereby rocking the shaft B and releasing the weight. At the moment the free end of the lever $B^6$ reaches the lower end of its traverse the latch E operates to lock said lever in its depressed position, thereby preventing for the time being the spring F from returning the cam $B^5$ to its original position, it being understood that the lug $b^{10}$ is at this time in engagement with the vertical wall $l^4$ of the slot $l'$. Thus the shaft $B^2$ is temporarily locked against returning to its original position, and the weight is permitted to drop freely. When the weight reaches the lower end of its traverse, it engages the forwardly-turned arm $e^2$ of the latch E, and thereby causes the latch to release the lever $B^6$, whereupon the strength of the spring F is sufficient to return the cam $B^5$ to its original position and elevate the lever $B^6$. The parts are then in position for a second operation of the machine.

It will be understood that the machine may be used either for the purpose of indicating the strength of a blow which a person may be able to give, or it may be used as a test of skill, the operator seeking to place the weight at a predetermined point. When the weight reaches the spring $h$, an additional element requires to be taken into the calculation, thereby increasing the uncertainty of the result and requiring a greater degree of skill. The plunger $B^4$ is commonly operated by striking it with the hand and for this reason is provided with a yielding knob. If desired, however, a mallet may be employed for operating said plunger.

In the modification shown in Fig. 16 the horizontal lever $B^3$ and vertical plunger $B^4$ are replaced by a bell-crank lever $B^7$ and a horizontally-disposed plunger $B^8$.

It readily will be understood that by employing the series of points on each of the vertical guides $A^2$ and giving to the points of one series a staggered relation with reference to the points of the other series a finer graduation is secured than would otherwise be possible.

Changes in details of construction within the spirit of my invention may be made. Hence no undue limitation is to be understood from the foregoing detailed description.

What I claim as new, and desire to secure by Letters Patent, is—

1. In a machine of the character described, the combination of a rock-shaft provided at one side with a series of teeth, a suitably-guided weight provided with a pawl in alinement with said teeth, assuming said rockshaft to be in its normal position of rest, means for rocking said rock-shaft to bring said pawl into engagement with a smooth portion thereof and release the weight, and means for temporarily locking said rock-shaft in its rotated position.

2. In a machine of the character described, the combination of a rock-shaft provided at one side with a series of teeth, a suitably-guided weight provided with a pawl in alinement with said teeth, assuming said rock-shaft to be in its normal position of rest, means for rocking said rock-shaft to bring said pawl into engagement with a smooth portion thereof and release the weight, means for temporarily locking said rock-shaft in its rotated position, means for restoring said rock-shaft to its original position, and releasing means for permitting the rock-shaft to return to its normal position of rest.

3. In a machine of the character described, the combination of a suitable rock-shaft provided with a series of teeth, a suitably-guided weight provided with a pawl, means for actuating said shaft in two directions, locking means for locking said actuating means in one position, and weight-actuated means for releasing said locking means.

4. In a machine of the character described, the combination of a suitably-journaled shaft provided with a series of teeth, a weight-guide, a weight provided with a pawl serving to engage said shaft, a cam connected with the lower end of said shaft provided with an inclined wall, a lever having means for engaging said inclined wall, means for actuating said lever in one direction to actuate said cam, and means for actuating said cam in the other direction to restore said lever.

5. In a machine of the character described, the combination of a suitably-journaled vertical shaft provided with a series of teeth, a suitably-guided weight provided with a pawl engaging said shaft, means for impelling said weight, a cam connected with said shaft, a vertically-swinging lever provided with cam-engaging means and serving to actuate said cam in one direction, means for restoring said cam to its original position, thereby restoring said lever to its original position, and a second vertically-disposed shaft provided with lever-actuating means.

6. In a machine of the character described, the combination of a suitably-journaled vertical shaft provided with a series of teeth, a suitably-guided weight provided with a pawl engaging said shaft, means for impelling said weight, a cam connected with said shaft, a vertically-swinging lever provided with cam-engaging means and serving to actuate said cam in one direction, means for restoring said cam to its original position, thereby restoring said lever to its original position, a second vertically-disposed shaft provided with lever-actuating means, and a weight-released latch for said lever.

7. In a machine of the character described, the combination of a suitably-journaled vertical shaft provided with teeth, a suitably-guided weight provided with a pawl engaging said shaft, weight-impelling means, a lever connected with said shaft and serving to operate the shaft in one direction, a spring serving to restore said shaft and lever to their original positions, and a second vertically-disposed shaft provided with a wheel having downwardly-extending teeth provided with inclined surfaces serving to actuate said lever in one direction.

8. In a machine of the character described, the combination of a suitably-journaled vertical shaft provided with teeth, a suitably-guided weight provided with a pawl engaging said shaft, weight-impelling means, a lever connected with said shaft and serving to operate the shaft in one direction, a spring serving to restore said shaft and lever to their original positions, a second vertically-disposed shaft provided with a wheel having downwardly-extending teeth provided with inclined surfaces serving to actuate said lever in one direction, a horizontally-disposed wheel connected with said last-named shaft and provided peripherally with hollows, and a spring-held device engaging said last-named wheel.

9. In a machine of the character described, the combination of a suitably-journaled vertically-disposed shaft provided with a series of teeth, a suitably-guided weight provided with a pawl engaging said shaft, a hollow plunger on said shaft serving to impel said weight, a lever serving to actuate said plunger, a plunger serving to actuate said lever, a vertically-swinging lever, cam connection between said lever and shaft, a second vertically-disposed shaft equipped with a wheel having downwardly-projecting teeth provided with inclined surfaces serving to actuate said lever in one direction, and a spring for restoring said first-named shaft and said lever to their original positions.

10. In a machine of the character described, the combination of a suitable weight-guide, a scale, a weight moving along said guide, a pawl carried by said weight, a suitable weight-impelling device and a relatively long weight-retarding spring projecting a considerable distance below the upper end of the traverse of said weight and serving to increase the uncertainty of result, substantially as and for the purpose set forth.

HERBERT S. MILLS.

In presence of—
WM. B. DAVIES,
ALBERT D. BACCI.